Sept. 4, 1962 F. W. KULESZA 3,052,564

PRINTING WITH MAGNETIC INK

Original Filed Dec. 20, 1954 2 Sheets-Sheet 1

INVENTOR
FRANK WILLIAM KULESZA
BY John A. Hall
ATTORNEY

Sept. 4, 1962 F. W. KULESZA 3,052,564

PRINTING WITH MAGNETIC INK

Original Filed Dec. 20, 1954 2 Sheets-Sheet 2

INVENTOR
FRANK WILLIAM KULESZA
BY [signature]
ATTORNEY

United States Patent Office 3,052,564

Patented Sept. 4, 1962

3,052,564

PRINTING WITH MAGNETIC INK

Frank William Kulesza, Poughkeepsie, N.Y., assignor to International Business Machines Corporation, New York, N.Y., a corporation of New York Original application Dec. 20, 1954, Ser. No. 476,534. Divided and this application Feb. 26, 1957, Ser. No. 642,506

1 Claim. (Cl. 117—17.5)

This is a division of application, Serial Number 476,534, filed December 20, 1954, now abandoned in favor of a continuation in part, Serial Number 669,406, filed June 27, 1957, now abandoned.

This invention relates to magnetic ink and particularly to the method of and means for the printing of intelligence representation characters to produce a record both visually understandable and magnetically detectible.

An object of the invention is to produce records on an expendable medium which will submit to both visual and magnetic inspection and which may be duplicated and easily erased.

A feature of the invention is a method of and means for recording information on any nonmagnetic surface in magnetically detectible and visually recognizable markings. According to this feature, and as one example thereof, a magnetic compound, hereinafter termed for convenience a magnetic ink, is deposited on a paper surface where it produces an outstanding color contrast so that it is clearly visible as conventional printing and where it will respond to magnetic scrutiny.

A feature of the invention is a thermoplastic magnetic powdered substance which may be deposited on any surface by conventional or other means to produce visible and magnetically detectible markings such as letters, numbers, diagrams, or any type of intelligence representing characters. Such a substance may be termed a magneitc ink, since after application it produces markings similar to those produced by conventional inks.

This magnetic ink is basically a fine powder consisting of granules of iron coated with a thermoplastic composition. Where the ink is to be used on ordinary white paper a colorless wax may be used, but where the printing is to be done on tinted paper the wax may be colored to match the surface. The wax is generally of the color of the surface on which the ink is to be deposited in order that on erasure no marking will be left.

In accordance with one embodiment of the invention the so-called magnetic ink is formed by making a mixture of finely ground iron, certain appropriate waxes, a resin and solvents, allowing this mixture to dry and then grinding the hardened mass to a given degree of fineness. This produces microscopic granules of iron each coated with the thermoplastic composition resulting from such process.

From a practical standpoint the ink consists of microscopic granules of iron each coated with a thermoplastic composition so that under pressure or heat or both, the ink will adhere strongly to a paper surface on which it has been deposited. The markings thus produced may be erased by heat and magnetism. By heating a surface containing such markings and selectively applying a magnetic field thereto the erasure may be selective.

Another feature of the invention is an ink whose composition is characterized by the use of a magnetic material of very high permeability and very low retentivity. It is an object of the invention to provide a powdered ink which will have greater adhesion to a paper surface than to a metal surface whereby such ink originally deposited on magnetized spots on a magnetic tape or drum may be easily and cleanly transferred to a paper surface. It is also an object to provide a magnetic ink which will adhere to magnetized areas of a magnetic surface and will not cling to areas not magnetized in such degree that cleanly defined markings are produced for transfer to the paper surfaces. Since the powdered iron has very low retentivity, the scavenging of the powder dusted over the whole magnetic surface from the non-magnetized areas is simple and may be carried out by any convenient method, as by centrifugal force, air streams, vacuum, electrostatic fields, or light mechanical brushing. The dusting may also be applied under a balanced field whereby the powder is selectively applied only to the magnetized areas. Where the intelligence representation characters are formed of a series of microscopic mounds of this ink, such spots may be integrated by pressure or heat or both into apparently continuous lines.

This ink may be deposited on the paper or other medium by any conventional means. In accordance with one method a magnetic surface may be selectively magnetized, the powdered ink then dusted on, the excess ink removed, the recorded characters then transferred by pressure to a paper surface and then fixed by pressure or heat or a combination thereof. In accordance with another method, a paper carrying the desired characters in any ink that is wet or made tacky in some manner may be dusted with the said powder while wet or tacky so that the printed characters will assume the magnetic properties of this mixture. Another property of the ink of the present invention is that it has high infra red characteristics so that for fixing and erasure purposes the paper surface may be passed under an infra red heating source where the markings will be heated sufficiently to soften the thermoplastic coverings of the granules without overheating the paper or surface on which the markings have been imprinted. The invention, however, is not limited to this use of infra red rays for selectively heating the inked characters since any heat source may be used for softening the ink so that it may be fixed by pressure or erased in a magnetic field.

A feature of the invention is the use of any nonmagnetic surface, such as paper, as a medium for the recording of detectible information. According to this feature the conventional use of a magnetic surface such as a wire, ribbon, or drum on which information is recorded magnetically is reversed so that a very cheap and expendable medium, such as a paper tape, may be used. On such a tape the information may be recorded by the deposit of ink having high magnetic permeability so that the record is both visually and magnetically detectible.

Another feature of the invention is the method of printing which consists in the making of a record in magnetic ink, transferring such record to a magnetic surface by passing the original record pressed against the said magnetic surface under a magnetic field and thereafter reproducing such record by dusting the magnetic surface with magnetic ink and transferring the record to a paper surface. By this method any record may be duplicated, either a record originally produced by the present ferrographic method or a record made in conventional ink.

Another feature of the invention is the use of the ink of the present invention for business records. Since the markings produced in this ink are magnetically scrutinizable the business record may be accompanied by code markings which will respond in an appropriate business machine for the usual business processing purposes.

Other features will appear hereinafter.

The drawings consist of two sheets having eleven figures, as follows.

The composition used for the purposes of this invention is fundamentally powdered iron treated with a thermoplastic mixture. The composition is formed by making a mixture of the iron powder, certain suitable waxes and resins in a suitable solvent whereby the separate granules of iron become coated with the thermoplastic mixture. When this syrupy mass has become hardened by evaporation of the solvents, it is ground to the desired degree of fineness and then used as a powder, though the invention also includes the use of this composition in liquid or paste form for conventional inking purposes. However, for high speed printing the powdered form is to be preferred.

Generally speaking, pure iron is to be preferred. While a higher permeability may be obtained by using some of the known high permeability alloys, it has been found that the permeability of the mass of iron granules in a matrix of thermoplastic material is not raised sufficiently over that of pure iron to overcome the cost differential. In other words, the extreme point in high permeability gained by the selective use of certain alloys is neither necessary for practicing the invention nor justifiable from the cost standpoint.

Certain commercially available waxes are employed. A chlorinated paraffin having the average molecular formula $C_{24}H_{29}Cl_{21}$ is employed. In order to raise the melting point of this wax a small portion of another commercially high melting point wax, which is a complex nitrogen derivative of the higher fatty acids and known to be a polyamide of stearic acid is added. These waxes plus the resin known as polyvinyl methyl ether, which forms a thermoplastic coating for the iron granules, are applied by dissolving them in toluene. The liquid formed of these waxes, resin and solvents is one that will satisfactorily wet the granultes of iron so that the coating thereof is complete. This solution is allowed to dry and harden and then the mass is ground by conventional methods to form a powder of the desired degree of fineness.

By way of example the following formula represents a composition found to be satisfactory from a commercial as well as a functional standpoint. It is to be understood that this is representative and that the invention is not limited to its use but that other compositions having similar properties may be used.

| | Parts by weight |
|---|---|
| Iron powder (300 mesh screen) | 30.0 |
| Polyvinyl methyl ether (50% aqueous solution) | 2.0 |
| Polyamide of stearic acid | 0.5 |
| Chlorinated paraffin ($C_{24}H_{29}Cl_{21}$) | 3.0 |
| Toluene | 6.5 |
| Total parts | 42.0 |

Figures 1, 2, 3, 4, 5, 6, 11:
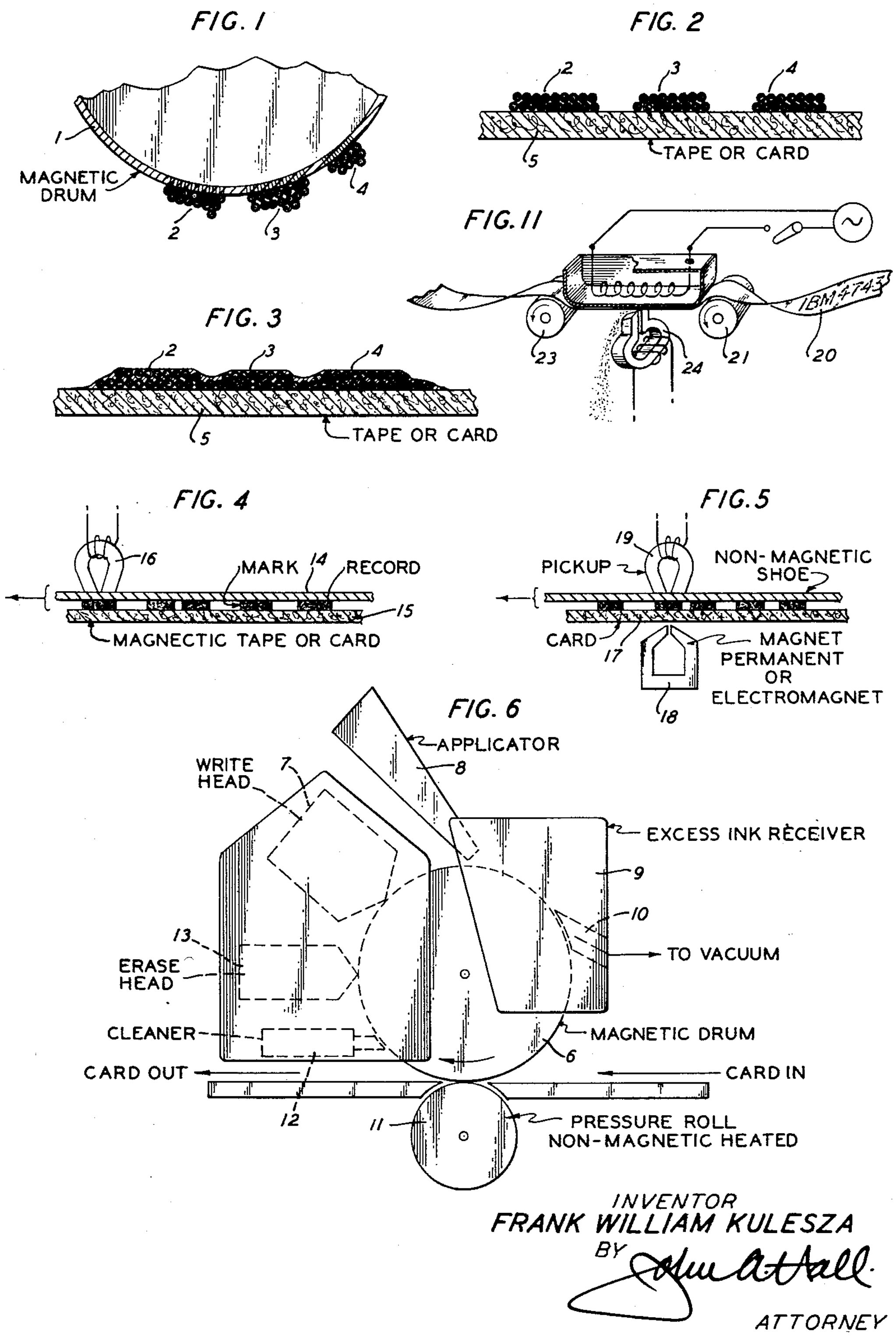
FIG. 1 is a fragmentary cross sectional view very greatly enlarged showing how the ink in the form of a magnetic dust will cling only to the magnetized areas of a magnetic surface.
FIG. 2 is a cross sectional view very greatly enlarged showing how the ink in the form of a magnetic dust is transferred by pressure to a tape or a card.
FIG. 3 is the same, showing how the various contiguous spots of the ink have been integrated by pressure or heat or both.
FIG. 4 is a schematic, fragmentary and cross sectional view showing how the markings in the magnetic ink on a record may be employed to produce a duplicate record on a magnetic tape or surface.
FIG. 5 is a similar arrangement showing how a record on a card may be passed through a magnetic field so that the markings thereon may be detected.
FIG. 6 is a schematic representation of the essential elements of a high speed printer by means of which intelligence characters electrically transmitted may be printed in the magnetic material ink of the present invention.
FIG. 11 is a fragmentary, schematic representation, partly in cross section, showing the means employed for the magnetic erasure of matter printed in the ink of the present invention.

In practicing the invention the surface of a magnetic tape or drum 1 may be selectively magnetized in spots in any conventional manner. If then this magnetic ink is dusted on this surface, masses of it will adhere to these magnetized areas. In FIG. 1 three such areas 2, 3 and 4 are indicated. The magnetic drum, very greatly enlarged in thickness for purposes of illustration is shown as having a plurality of lines normal to the surface thereof as an indication of the magnetized condition thereof. Masses 2, 3 and 4 of the magnetic ink in the form of tiny granules of iron coated with a thermoplastic composition are shown clinging to these magnetized areas, and forming a somewhat irregular outer surface. Other areas of the surface of the magnetic drum are shown as clean with none of the granules of ink clinging thereto. This is an indication of the fact that the granules of ink have low retentivity and therefore will not cling to another magnetic surface. In practice it is found that this ink will adhere more readily to a paper surface than to such a magnetic surface, so that if a paper such as a tape or a card is pressed against the drum carrying this area of ink powder, the ink will be transferred to the paper as indicated in FIG. 2, where the masses 2, 3 and 4 are shown as now adhering to the tape or card 5.

For a better understanding of this operation one should refer to FIG. 6 where a schematic representation of a device similar to a tape printer is illustrated. There is provided a magnetic drum 6 which is being constantly rotated in the direction indicated and at a surface speed very much higher than one on which conventional printing may be impressed. A write head 7 is provided by which, through electrical transmission of pulses thereto, spots on the surface of the drum may be magnetized, much in the manner in which characters are written on a moving surface disclosed in the C. E. Hunt, Jr. Patent Re. 23,713. As the drum 6 rotates, a mass of the iron dust ink stored in the applicator 8 is poured on the surface thereof so that masses of it will adhere to the magnetized spots on the drum. The excess ink will be collected in the excess ink receiver 9, partly by centrifugal force and partly by vacuum cleaning means applied by a nozzle 10. Therefore, masses of ink, clearly defining intelligence characters will be carried by the drum 6 toward the point where a tape or a card will be pressed solidly by a roll 11 against the drum 6 so that the ink is thus transferred to the tape or the card. The roll 11 may be heated so that the thermoplastic coating of the granules will be melted. When heat is applied for the purpose of fixing the record, or for purposes of erasure, hereinafter described, a separate source such as an infra red ray lamp placed in the path of the record as it leaves the transfer roll may be employed. Here the heating effect will be selectively greater on the ink partly because of its color than on the record surface so that the melting or softening of the thermoplastic coating of the granules may proceed at a speed commensurate with the printing speed. It is to be noted that the transfer of the ink to the paper may be made under pressure alone or under the combination of pressure and temperature, the amount of pressure decreasing as the temperature is increased.

Figure 7:
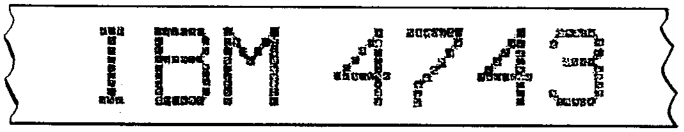
FIG. 7 is a representation of characters as they would appear as the ink is transferred from a magnetic drum to a paper tape.
Figure 8:
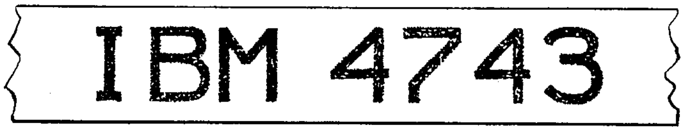
FIG. 8 is the transformation of these characters by the integration of the separate dots through heat and pressure, the transformation being somewhat exaggerated for the purpose of indicating the fact that the dotted character thereof almost completely disappears and the characters become very highly legible.

FIG. 7 is an illustration of certain intelligence characters transferred to a tape with the outlines of the magnetized spots of the drum sharply defined. However, the final effect is much more legible as these spots are integrated by pressure and heat so that through the thermoplastic nature of the ink there is a flowing together of the contiguous spots. FIG. 8 is what might be termed an idealized transformation and integration of the separate spots shown in FIG. 7. Since both these figures are greatly enlarged it will be realized that the final effect produced and here idealized in FIG. 8 is a very legible marking, as legible in fact as the conventional newsprint renditions, which under a glass are seen to be made up of a plurality of more or less integrated spots of ink.

The integration here is illustrated in FIG. 3, where the masses 2, 3 and 4 of FIG. 2 are shown to have been pressed and flowed into one another, so that to the naked eye a line of spots appears to be a continuous line.

Returning to FIG. 6 it will be noted that after the surface of the drum 6, bearing intelligence characters, passes beyond the pressure roll 11, any ink, if any, left thereon may be cleaned off by the cleaner 12, in the form of a vacuum nozzle or a rubbing means such as of felt or a brush. Thereafter the surface of the drum passes under an erase head 13 which may be of conventional design to demagnetize the drum and leave it clear for a new impression as the drum again passes under the write head 7.

A feature of the present invention is that a record card or paper may be duplicated. The record 14 shown in FIG. 4 having on the surface thereof various markings in the ink of the present invention may be pressed against a magnetic tape or other surface 15 and the two then passed under the influence of a field, here shown as an electromagnet 16. The low reluctance of the inked markings afford a path for the field whereas the spaces not covered by the inked markings interposes a high reluctance path so that the markings on the record are transferred magnetically to the magnetic tape or surface 15 which may then be used in the manner hereinabove described.

In accordance with another feature of the invention, the magnetic markings on a record may be magnetically scanned or detected. This is schematically illustrated in FIG. 5, where the card 17 is shown passing between a magnet 18 and a conventional pick-up device 19 whereby a response will be produced in the pick-up 19 each time a marking of low reluctance passes between these units 18 and 19 and thus affords a path for the flux from the magnet 18. The magnet 18 may be either a permanent magnet or an electromagnet.

Figure 9:
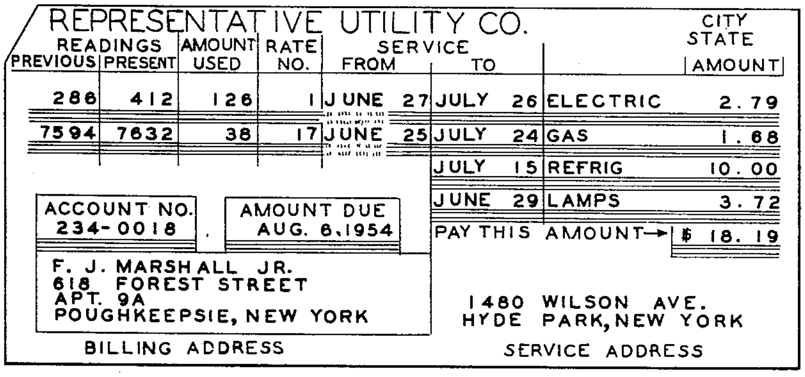
FIG. 9 is a representation of a service bill as it would appear when printed with the ink of the present invention, illustrating how the data may be underlined with lines of code markings which being magnetic in character may be magnetically scanned for processing in a business machine.
Figure 10:
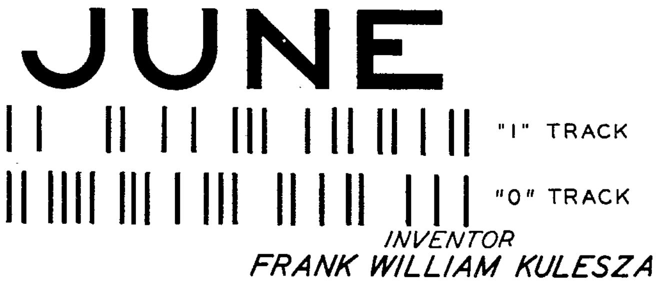
FIG. 10 is a very much enlarged portion from the record card of FIG. 9 showing in more detail the code markings underlining the data thereon.

One use which may be made of such an arrangement is illustrated in FIGURES 9 and 10. Here a business record is depicted. The data thereon is printed in the magnetic ink of the present invention, both in ordinary chirography and in code markings much in the manner of the ubiquitous punched cards, only here the record is not perforated but contains the code in lines of markings underlining the ordinarily printed data. This underlining may appear to the customer as somewhat hazy lines, but there are in fact, and as shown greatly enlarged in FIGURE 10, series of vertical markings which may be read magnetically and processed conventionally by a business machine.

In accordance with the spirit of the invention and the principal object thereof, the ink may be applied in any manner. It may be prepared as a powder as above described whereupon it is suitable for high speed printing since no drying time is involved. Where such drying time is unimportant, the powder may be mixed as a paste and applied by conventional printing processes, or it may be mixed as a liquid to be applied by hand.

As a powder and for high speed printing the magnetic properties of the ink are employed in the forming of the intelligence characters on the magnetized areas of a magnetic surface before transfer to the paper or card. The ink may be applied in any other manner when its magnetic properties are to be employed after the record has been fixed.

When a record, conventionally printed, is to be duplicated such record may be heated, by an infra red ray lamp or any other method, to make the ordinary printer's ink tacky, whereupon such record is dusted with the ink of the present invention and the markings fixed by pressure.

The ink produces a good record since it does not smudge and does not erase easily by conventional means, yet remarkably clean erasures may be made by heating the record and then passing it through a magnetic field whereupon the ink is lifted off the record without injury to the surface of the paper. Generally speaking, where there is any likelihood of erasure, the waxes employed in the compounding of the mixture are either neutral or of the same color as the surface on which the printing is to be done, or do not stain such surface so as to leave a noticeable marking after the magnetic erasure. Such erasure method is illustrated in FIG. 11 where a printed tape 20 is passed from the right to the left over a roller 21, the face of a heater 22 here shown as a conventional electrically heated plate, and thence over another roller 23, the rollers 21 and 23 merely representing any conventional means for holding the tape 20 in contact with the hot plate 22. As the tape moves toward the left and the thermoplastic coating of the iron granules becomes softened by the heat, the tape passes the magnet 24, which cleanly lifts the inked markings off the tape. Since the thermoplastic mixture is neutral in color it leaves no stain on the paper tape and hence the erasure is complete and the paper is left substantially in its original condition. The magnet 24 is here shown as an electromagnet so that erasure takes place only during the energization thereof, even though the tape may be heated by passage over the face of the hot plate 22. In this manner the erasure may be made selective, that is only selected characters, letters, words, or other portions of the printed matter may be removed. It will be understood, however, that the magnet 24 may be a permanent magnet so that all matter passing it may be removed.

For reference purposes, it may be noted that the chemical nature of some of the components of the composition may be stated as follows.

Polyvinyl methyl ether is commercially available under that name and cannot be identified under any other name. Its chemical structure may be expressed as

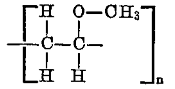

Polyamide of stearic acid is commercialy available as Acrawax C. Applicant does not know its exact chemical structure.

Chlorinated paraffin ($C_{24}H_{29}Cl_{21}$) is commercially available under the trade name Chlorowax 70.

What is claimed is:

A printing process consisting of the steps of forming an image by magnetizing points distributed in the form of said image on a magnetizable surface, applying to said surface a powder formed of microscopic granules of magnetizable material coated with a thermoplastic mixture consisting of about 2.0 parts of polyvinyl methyl ether, about 0.5 part of polyamide of stearic acid, about 3.0 parts of chlorinated paraffin and about 6.5 parts of toluene, thereby causing said powder to adhere to said surface at said magnetized points in a plurality of layers of said coated granules, removing said powder from unmagnetized portions of said surface, engaging said surface with a sheet of paper under pressure, thereby causing the thermoplastic material adhering to the magnetized points of said surface to become attached to said paper with sufficient force to remove said layers of coated granules from said magnetized surface, and heating said layers of coated granules on said paper to soften the thermoplastic coating thereof so that said layers flatten out causing the points to flow together.

References Cited in the file of this patent

UNITED STATES PATENTS

| | | |
|---|---|---|
| 1,820,194 | Huebner | Aug. 25, 1931 |
| 2,297,691 | Carlson | Oct. 6, 1942 |
| 2,436,829 | Roth | Mar. 2, 1948 |
| 2,547,838 | Russell | Apr. 3, 1951 |
| 2,573,881 | Walkup et al. | Nov. 6, 1951 |
| 2,650,024 | Ferrin | Aug. 25, 1953 |
| 2,791,561 | Beller | May 7, 1957 |
| 2,841,461 | Gleason | July 1, 1958 |
| 2,874,063 | Greig | Feb. 17, 1959 |
| 2,884,348 | Kulesza | Apr. 28, 1959 |

OTHER REFERENCES

Berry et al.: Ferromagnetography. Pub. in General Electric Review. Vol. 55, No. 4, July 1952. Only pp. 20, 21, 22 and 61 made of record. Copy available in Div. 17. (101/E.S.)